(12) United States Patent
Sugimoto

(10) Patent No.: US 11,083,063 B2
(45) Date of Patent: Aug. 3, 2021

(54) CONTROL DEVICE, ILLUMINATION DEVICE, AND PROGRAM FOR CONTROL DEVICE

(71) Applicant: YAZAKI CORPORATION, Tokyo (JP)

(72) Inventor: Terumitsu Sugimoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/722,320

(22) Filed: Dec. 20, 2019

(65) Prior Publication Data

US 2020/0245429 A1 Jul. 30, 2020

(30) Foreign Application Priority Data

Jan. 24, 2019 (JP) .............................. JP2019-010475

(51) Int. Cl.
| | |
|---|---|
| *H05B 45/325* | (2020.01) |
| *H05B 45/20* | (2020.01) |
| *H05B 47/16* | (2020.01) |
| *H05B 45/10* | (2020.01) |

(52) U.S. Cl.
CPC ........... *H05B 45/325* (2020.01); *H05B 45/10* (2020.01); *H05B 45/20* (2020.01); *H05B 47/16* (2020.01)

(58) Field of Classification Search
None
See application file for complete search history.

(56) References Cited

U.S. PATENT DOCUMENTS

| | | |
|---|---|---|
| 2004/0164687 A1 | 8/2004 | Nakamura et al. |
| 2007/0247072 A1 | 10/2007 | Norimatsu |
| 2011/0181197 A1 | 7/2011 | Kanda et al. |
| 2011/0248642 A1 | 10/2011 | Kikuchi et al. |
| 2012/0326607 A1 | 12/2012 | Kanda et al. |
| 2013/0162141 A1 | 6/2013 | Kanda et al. |
| 2014/0049179 A1 | 2/2014 | Kikuchi et al. |
| 2014/0055051 A1* | 2/2014 | Raval ..................... H05B 45/37 315/193 |
| 2014/0184089 A1* | 7/2014 | Porter ....................... G01J 3/10 315/210 |
| 2016/0338157 A1 | 11/2016 | Kurishita et al. |

(Continued)

FOREIGN PATENT DOCUMENTS

| | | |
|---|---|---|
| DE | 10 2010 046 795 A1 | 3/2012 |
| JP | 2004-186085 A | 7/2004 |

(Continued)

*Primary Examiner* — Crystal L Hammond
(74) *Attorney, Agent, or Firm* — Sughrue Mion, PLLC

(57) ABSTRACT

A control device including a CPU is provided. The CPU outputs a plurality of pulses each having a duty set independently to LED. The CPU creates a schedule in which on-timing and off-timing of the plurality of pluses are designated such that the on-timing or the off-timing of two or more of the plurality of pulses is respectively not close to each other based on the set duty and a duty of the pulse. Further, the CPU sets, in a timer for counting time, time from a time point where the timer finishes counting the time already set to on-timing or off-timing of a pulse to be first turned on or off after the time point in accordance with the schedule. The CPU turns on or off the pulse in accordance with the schedule when the timer finishes counting the set time.

9 Claims, 5 Drawing Sheets

(56) References Cited

U.S. PATENT DOCUMENTS

2018/0354416 A1* 12/2018 Ishikawa .................. B60Q 3/80
2019/0141802 A1*  5/2019 Saes ........................ F21S 2/005

FOREIGN PATENT DOCUMENTS

| JP | 2007-290450 A | 11/2007 |
| JP | 2011-221262 A | 11/2011 |
| WO | 2009019945 A1 | 2/2009 |
| WO | 2012/151678 A1 | 11/2012 |

* cited by examiner

| PORT | DUTY [100%] |
|---|---|
| ch1 | 100 |
| ch2 | 0 |
| ch3 | 50 |
| ch4 | 25 |
| ch5 | 70 |
| ch6 | 15 |
| ch7 | 80 |
| ch8 | 90 |
| ch9 | 85 |
| ch10 | 30 |
| ch11 | 40 |
| ch12 | 20 |
| ch13 | 14 |
| ch14 | 13 |
| ch15 | 11 |
| ch16 | 9.8 |
| ch17 | 4.5 |
| ch18 | 2.9 |

| PORT | DUTY [100%] |
|---|---|
| ch1 | 100 |
| ch8 | 90 |
| ch9 | 85 |
| ch7 | 80 |
| ch5 | 70 |
| ch3 | 50 |
| ch11 | 40 |
| ch10 | 30 |
| ch4 | 25 |
| ch12 | 20 |
| ch6 | 15 |
| ch13 | 14 |
| ch14 | 13 |
| ch15 | 11 |
| ch16 | 9.8 |
| ch17 | 4.5 |
| ch18 | 2.9 |
| ch2 | 0 |

| PORT | DUTY [100%] | ON [μs] | OFF [μs] |
|---|---|---|---|
| ch1 | 100 | 100 | 10000 |
| ch8 | 90 | 300 | 9300 |
| ch9 | 85 | 500 | 9000 |
| ch7 | 80 | 700 | 8700 |
| ch5 | 70 | 900 | 7900 |
| ch3 | 50 | 1100 | 6100 |
| ch11 | 40 | 1300 | 5300 |
| ch10 | 30 | 1500 | 4500 |
| ch4 | 25 | 1700 | 4200 |
| ch12 | 20 | 1900 | 3900 |
| ch6 | 15 | 2100 | 3600 |
| ch13 | 14 | 2300 | 3700 |
| ch14 | 13 | 2500 | 3800 |
| ch15 | 11 | 2700 | 3800 |
| ch16 | 9.8 | 2900 | 3880 |
| ch17 | 4.5 | 3100 | 3550 |
| ch18 | 2.9 | 3300 | 3590 |
| ch2 | 0 | 0 | 100 |

| PORT | ON [μs] | OFF [μs] | ADD |
|---|---|---|---|
| ch1 | 100 | 10000 | |
| ch8 | 300 | 9300 | |
| ch9 | 500 | 9000 | |
| ch7 | 700 | 8700 | |
| ch5 | 900 | 7900 | |
| ch3 | 1100 | 6100 | |
| ch11 | 1300 | 5300 | |
| ch10 | 1500 | 4500 | |
| ch4 | 1700 | 4200 | |
| ch12 | 1950 | 3950 | 50 |
| ch6 | 2150 | 3650 | 50 |
| ch13 | 2300 | 3700 | |
| ch14 | 2500 | 3800 | |
| ch15 | 2750 | 3850 | 50 |
| ch16 | 2900 | 3880 | |
| ch17 | 3100 | 3550 | |
| ch18 | 3300 | 3590 | |
| ch2 | 0 | 100 | |

CONTROL DEVICE, ILLUMINATION DEVICE, AND PROGRAM FOR CONTROL DEVICE

CROSS-REFERENCE TO RELATED APPLICATIONS

This application is based on and claims priority under 35 USC 119 from Japanese Patent Application No. 2019-010475 filed on Jan. 24, 2019, the contents of which are incorporated herein by reference.

TECHNICAL FIELD

The present invention relates to a control device that outputs a plurality of pulses each having a duty set independently, an illumination device in which a light source is controlled by the control device, and a program for the control device.

BACKGROUND ART

Conventionally, a pulse width modulation (PWM) control has been used to control a light source of an automobile as a plurality of loads described above (Patent Literatures 1, 2). By controlling the light source by the PWM control, brightness of the light source can be easily changed. Specifically, the brightness can be adjusted by changing a pulse width for one cycle. In addition, by gradually changing to a target duty, the light source can be gradually brightened or darkened.

The PWM control described above is performed using a PWM function of a general-purpose microcomputer. In the PWM function, a CPU of the microcomputer turns on (rises) a pulse and causes a timer to count time from on to off (fall) of the pulse based on the set duty. When the timer count ends, the CPU turns off the pulse, and then causes the timer to count the time from when the pulse is turned off to the end of one cycle of the pulse. When the timer count ends, the CPU then turns on the pulse again and repeats the above-described operation.

The CPU is provided with a plurality of ports so that a plurality of pulses can be output. In addition, the duties of the plurality of pulses can be set optionally. However, with the use of the timer described above, the timers are required for the number of ports, and it is necessary to use an expensive CPU, which is a problem in terms of cost.

In order to reduce high-frequency noise, it is considered to prevent the plurality of pulses from being turned on and off at the same time. In this case, there has been a problem that a timer is further required in order to shift the plurality of pulses on and off.

CITATION LIST

Patent Literature

Patent Literature 1: JP-A-2007-290450
Patent Literature 2: JP-A-2004-186085

SUMMARY OF INVENTION

The present invention has been made in view of the above-described circumstances, and an object thereof is to provide a control device, an illumination device, and a program for a control device in consideration of noise at low cost.

In order to achieve the above object, a control device, an illumination device, and a program for a control device according to the present invention are characterized by the following [1] to [8].

[1] A control device that outputs a plurality of pulses each having a duty set independently, the control device including:
a schedule creation section configured to create a schedule in which on-timing and off-timing of the plurality of pulses are designated such that the on-timing or the off-timing of two or more of the plurality of pulses is respectively not close to each other, based on the set duty and a cycle of the pulse;
a setting section configured to set, in a timer for counting time, time from a time point where the timer finishes counting the time already set to on-timing or off-timing of a pulse to be first turned on or off after the time point in accordance with the schedule; and
a pulse output section configured to turn on or off the pulse in accordance with the schedule when the timer finishes counting the set time.

[2] The control device according to the above configuration [1],
wherein the schedule creation section includes
a first creation section configured to create the schedule in which one of the on-timing and the off-timing of the plurality of pulses is shifted at a constant interval,
a second creation section configured to create the schedule by obtaining another of the on-timing and the off-timing of the plurality of pulses based on the set duty from the one of the on-timing and the off-timing created by the first creation section, and
a correction section configured to correct the schedule so as to shift the other of the on-timing and the off-timing of the pulses at which the other of the on-timing and the off-timing is close, when the other of the on-timing and the off-timing of two of the plurality of pulses is close.

[3] The control device according to the above configuration [2],
wherein the correction section corrects the schedule by adding a predetermined value to the other of the on-timing and the off-timing of one of the two pulses at which the other of the on-timing and the off-timing is close.

[4] The control device according to the above configuration [2] or [3],
wherein the correction section determines that the other of the on-timing and the off-timing is close when a difference of the other of the on-timing and the off-timing of the plurality of pulses is less than predetermined time.

[5] The control device according to any one of the above configuration [2] to [4],
wherein the first creation section arranges the plurality of pulses in an order of a value of the set duty, and shifts the one of the on-timing and the off-timing at a constant interval in the arrangement order.

[6] An illumination device including:
the control device according to any one of the above configuration [1] to [5]; and
a plurality of light sources controlled by a plurality of pulses output from the control device.

[7] A control method for a control device that outputs a plurality of pulses each having a duty set independently, the control method including:
a schedule creation step configured to create a schedule in which on-timing and off-timing of the plurality of pulses are designated such that the on-timing or the off-timing of two or more of the plurality of pulses is respectively not close to each other, based on the set duty and a cycle of the pulse;

a setting step configured to set, in a timer for counting time, time from a time point where the timer finishes counting the time already set to on-timing or off-timing of a pulse to be first turned on or off after the time point in accordance with the schedule; and a pulse output step configured to turn on or off the pulse in accordance with the schedule when the timer finishes counting the set time.

[8] The control method according to the above configuration [7], wherein the setting step and the pulse output step are performed as an interrupt processing by interrupting the schedule creation section, every time the timer finishes counting the set time.

[9] A computer readable storage medium on which a program for a control device so as to executing the control method according to claim 7 or 8 by a computer is stored.

According to the control device having the above configurations, the plurality of pulses, each of which the duty is independently controlled, can be output by the one timer so that the on-timing or the off-timing of the two or more pulses is not close. As a result, it is possible to provide the control device and the program for the control device in consideration of noise at low cost.

According to the control device having the above configuration [2], the one of the on-timing and the off-timing of the pulses is shifted at the constant interval, and the other timing is corrected so as to be shifted, so that it is possible to easily create the schedule in which the on-timing and the off-timing of the two or more pulses is not close.

According to the control device having the above configuration [3], the other timing can be corrected simply by adding the predetermined value to the other of the on-timing and the off-timing.

According to the control device having the above configuration [4], it is possible to easily determine that the other of the on-timing and the off-timing of the pulses is close.

According to the control device having the above configuration [5], by arranging the one timing in the order of the values of the duties at the constant interval, it is possible to prevent the other timing from coming close.

According to the control device having the above configuration [6], the plurality of light sources can be controlled.

According to the program for the control device having the above configuration [9], the program can be easily executed by one control device.

According to the present invention, it is possible to provide the control device, the illumination device, and the program for the control device in consideration of the noise at the low cost.

The present invention has been briefly described above. Further, details of the present invention will be clarified by reading a mode (hereinafter, referred to as "embodiment") for carrying out the invention to be described below with reference to accompanying drawings.

DESCRIPTION OF EMBODIMENTS

A specific embodiment according to the present invention will be described below with reference to drawings.

Figure 1:
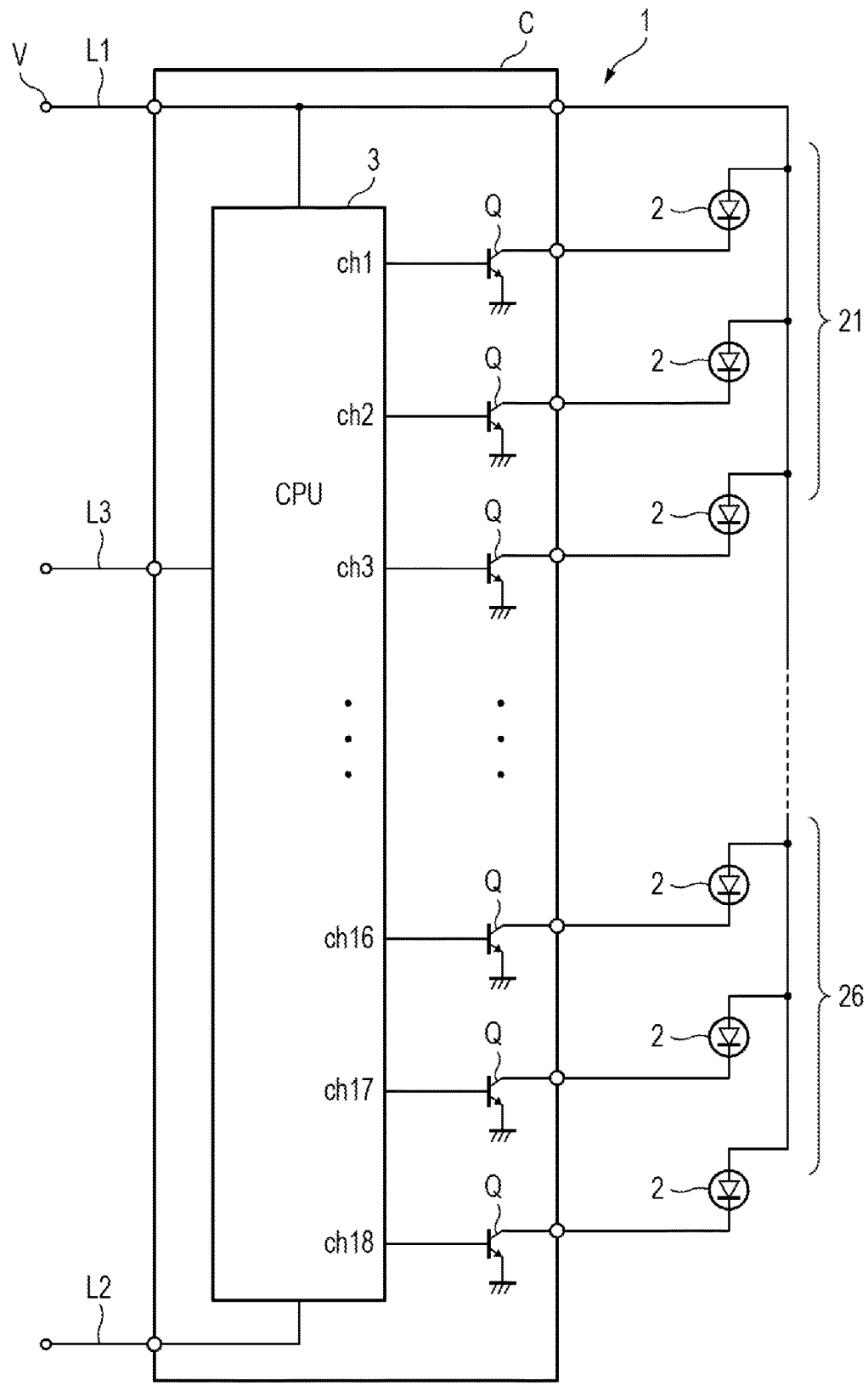
FIG. 1 is a circuit diagram showing an embodiment of an illumination device incorporating a CPU as a control device of the present invention.

An illumination device 1 incorporating a CPU 3 as a control device of the present invention will be described with reference to FIG. 1. The illumination device 1 of the present embodiment is a device configured to PWM-control a plurality of LEDs (light sources) 2 mounted in a vehicle interior of an automobile, for example. As shown in FIG. 1, the illumination device 1 includes the plurality of LEDs 2, a plurality of FETQs, and the CPU 3 used as the control device.

In the present embodiment, 18 LEDs 2 are provided. The plurality of LEDs 2 are provided with six full-color LEDs 21 to 26 configured by three-color LEDs 2 of red, green, and blue. The full-color LEDs 21 to 26 emit light in full color by adjusting brightness of the three-color LEDs 2. Anodes of the plurality of LEDs 2 are connected in common and are connected to a power source V.

The plurality of FETQs are provided in the same number 18 as the plurality of LEDs 2, and the FETQs and the LEDs 2 are provided in a one-to-one correspondence. Each of the plurality of FETQs has a drain connected to a cathode of the corresponding LEDs 2, and a source connected to the ground. As a result, when the FETQ is turned on, the power source V is supplied to the LED 2 so as to turn on the LED 2, and when the FETQ is turned off, the power source V to the LED 2 is cut off so as to turn off the LED 2.

The CPU 3 as the control device outputs PWM controlled pulses from the plurality of ports ch1 to ch18, respectively. Gates of the FETQs are connected to the ports ch1 to ch18, respectively. The CPU 3 can adjust the brightness of each of the plurality of LEDs 2 independently by outputting the plurality of PWM controlled pulses. Accordingly, for example, colors of the full-color LEDs 21 to 26 can be adjusted manually by a user, or the colors of the full-color LEDs 21 to 26 can be automatically changed in accordance with a predetermined trigger such as when a door is opened and/or closed.

In the present embodiment, the CPU 3 and the plurality of FETQs described above are incorporated in a housing of a connector C for connecting electric wires, such as a power supply line L1 and a ground line L2, to the LEDs 2. In addition, a communication line L3 is connected to the connector C, and the CPU 3 and an external control device can communicate with each other.

The colors of the full-color LEDs 21 to 26 described above are changed manually or automatically at any timing as described above. In addition, a table showing a relationship between the colors and duties of the three-color LEDs 2 is stored in advance in a storage unit (not shown). Every time the color is changed, the CPU 3 obtains the duty of each of the three-color LEDs 2 corresponding to the changed color with reference to the table. Then, the CPU 3 changes a setting of the obtained duty as a duty of a pulse to be output to each of the three-color LEDs 2. Incidentally, the change in the setting of the duty using the above-described table may be performed by the external control device, and a result thereof may be transmitted to the CPU 3.

Next, an outline of an operation of the illumination device 1 having the above-described configuration will be described with reference to FIG. 2. In the embodiment shown in FIG. 1, the 18 ports ch1 to ch18 are provided in the CPU 3, but here, in order to simplify the description, an example in which a total of two ports chX, chY are provided in the CPU 3, and duties 95% and 90% are respectively set to the ports chX, chY will be described. First, as shown in FIG. 2, based on the set duties, the CPU 3 creates a schedule in which on-timing and off-timing of the pulses are designated such that the on-timing of the pulses from the ports chX, chY is not close to each other, and the off-timing of the pulses is not close to each other.

Figure 2:
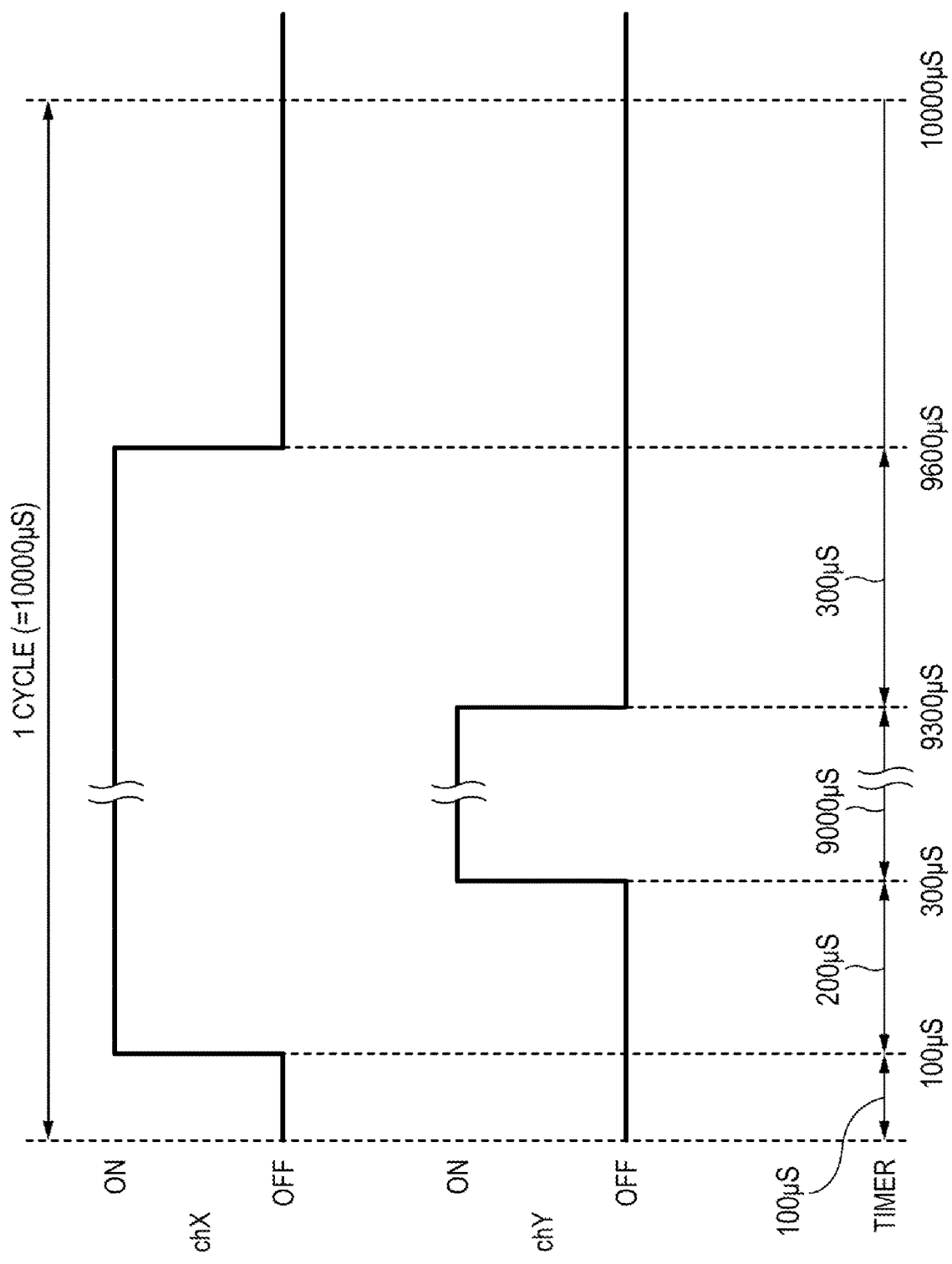
FIG. 2 is a time chart of pulses output from ports chX, chY and time set in a timer for simply explaining an operation of the illumination device shown in FIG. 1.

In the example shown in FIG. 2, the schedule is created in which the pulses of the ports chX, chY are respectively turned on at 100 µs and 300 µs from start of one cycle (10000 µs in this case) of the pulses. In addition, the schedule is created in which the pulses of the ports chX, chY are turned off at 9600 µs (=100 µs+10000 µs×0.95) and 9300 µs (=300 µs+10000 µs×0.9), respectively.

The CPU 3 outputs the pulses from the ports chX, chY in accordance with the schedule created as described above. Specifically, the CPU 3 first sets a soft timer to 100 µs, and sets the pulse from the port chX as a pulse to be first turned on. When the soft timer finishes counting 100 µs, the CPU 3 turns on the pulse from the port chX. Subsequently, the CPU 3 sets the pulse from the port chY as the pulse to be first turned on after the time point from the end of the timing, and sets the soft timer to time of 200 µs (=300 µs−100 µs) until the pulse from the port chY is turned on. Thereafter, when the soft timer finishes counting 200 µs, the CPU 3 turns on the pulse from the port chY.

Next, the CPU 3 sets the pulse from the port chY as the pulse to be first turned off after the time point from the end of the timing, and sets the soft timer to time of 9000 µs (=9300 µs−300 µs) until the pulse from the port chY is turned off. When the soft timer finishes counting 9000 µs, the CPU 3 turns off the pulse from the port chY. Subsequently, the CPU 3 sets the pulse from the port chX as the pulse to be first turned off after the time point from the end of the timing, and sets the soft timer to time of 300 µs (=9600 µs−9300 µs) until the pulse from the port chX is turned off.

When the soft timer finishes counting 300 µs, the CPU 3 turns off the pulse from the port chX. When the output of the pulses from all of the ports chX, chY ends, the CPU 3 sets an end flag. Accordingly, the duties of the pulses from the ports chX, chY can be controlled as set using the one soft timer.

Figure 3:
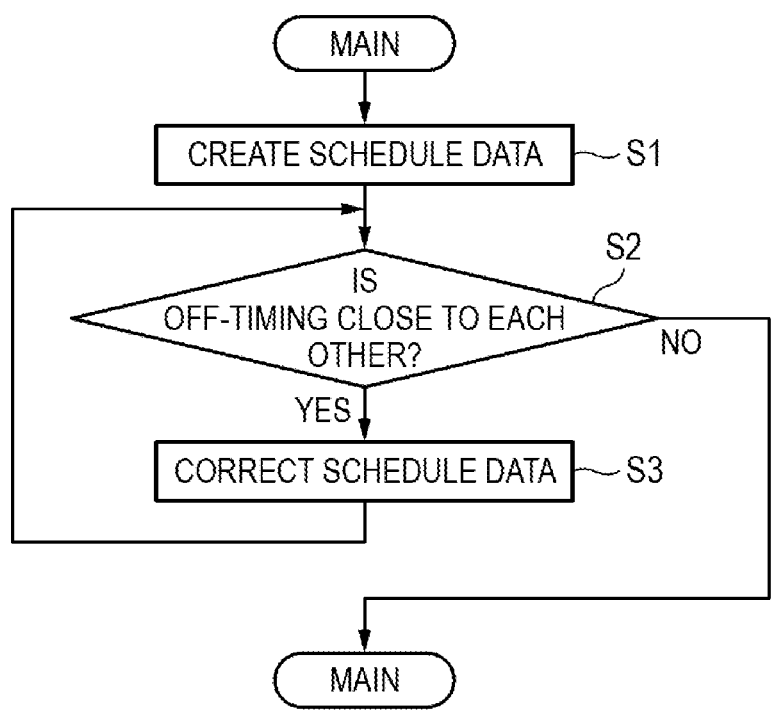
FIG. 3 is a flow chart showing a main processing procedure executed by the CPU shown in FIG. 1.
Figure 4:
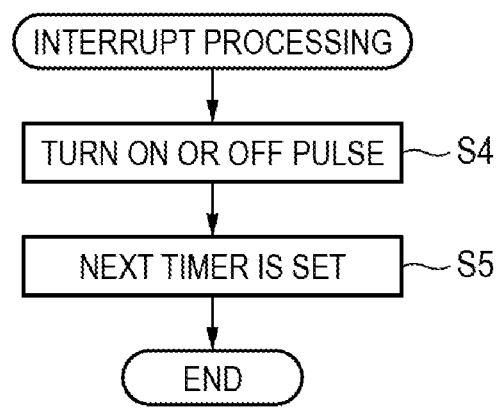
FIG. 4 is a flow chart showing an interrupt processing procedure executed by the CPU shown in FIG. 1.

Next, a detailed operation of the illumination device 1 described above will be described with reference to FIGS. 3 to 5. Programs for a main processing shown in FIG. 3 and an interrupt processing shown in FIG. 4 are stored in a storage medium (not shown). The CPU 3 executes these programs to realize the main processing and the interrupt processing.

The pulses output from the ports ch1 to ch18 described above are all output at the same cycle (for example, 10000 µs). The CPU 3 functions as a schedule creation section, and executes the main processing shown in FIG. 3 for each cycle of the pulse described above. In the main processing, the CPU 3 functions as a first creation section and a second creation section, and creates a schedule in which the on-timing and the off-timing of the plurality of pulses are designated such that the on-timing of the plurality of pulses is not close to each other (step S1).

Step S1 will be described in detail. The CPU 3 obtains the duties set for the pulses of the ports ch1 to ch18 as described above. An example of the obtained duties is shown in FIG. 5A.

Figures 5A, 5B, 5C, 5D:
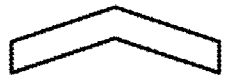
FIG. 5A to 5D are time tables for explaining an operation of the main processing shown in FIG. 1.

Next, as shown in FIG. 5B, the CPU 3 rearranges the pulses in a descending order of the duties. Thereafter, as shown in FIG. 5C, the CPU 3 sets the on-timing of the pulse of the port ch1 having the largest duty to, for example, 100 µs. In addition, the CPU 3 creates the schedule in which the on-timing of the pulses are shifted at a constant interval in an arrangement order of the pulses.

In the present embodiment, the schedule in which the on-timing of the pulses is shifted at the constant interval=200 µs is created. Specifically, as shown in FIG. 5C, the CPU 3 designates the on-timing of the pulse of the port ch8 having the second largest duty to 300 µs. In addition, the on-timing of the pulse of the port ch9 having the third largest duty is designated to be 500 µs. Incidentally, the on-timing of the pulse of the port ch2 having the duty of 0% is designated at 0 µs.

The CPU 3 obtains the schedule in which the timing at which the plurality of pulses are turned off are designate based on the duties obtained from the schedule created as described above. For example, as shown in FIG. 5C, since the pulse of the port ch1 has the on-timing of 100 µs and the duty of 100%, the off-timing is 10100 µs (=100 µs+10000 µs×1). Incidentally, in the present embodiment, as a result of obtaining the off-timing based on the duty, the CPU 3 creates the schedule in which all of the pulses with the timing exceeding one cycle are turned off after the one cycle (=10000 µs).

Since the pulse of the port ch8 has the on-timing of 300 µs and the duty of 90%, the CPU 3 creates the schedule with 300 µs+one cycle×0.9=9300 µs as the off-timing. Similarly, the CPU 3 obtains the off-timing of all of the pulses of the ports ch1 to ch18, creates the schedule, and ends step S1. Incidentally, the off-timing of the pulse of the port ch2 having the duty of 0% is designated to 100 µs.

In the schedule created in step S1 described above, the on-timing of all of the pulses output from the ports ch1 to ch18 can be shifted, but the off-timing may be close to each other. Therefore, the CPU 3 determines whether or not the off-timing of two pulses is close to each other (step S2).

In step S2, the CPU 3 determines that the off-timing is close to each other when a difference in the off-timing of the pulses is less than predetermined time (29 µs in the present embodiment) in the schedule created in step S1. In the present embodiment, it is determined that the off-timing (3900 µs) of the pulse from the port ch12 and the off-timing (3880 µs) of the pulse from the port ch16 are close to each other.

It is determined that the off-timing (3600 µs) of the pulse from the port ch6 and the off-timing (3590 µs) of the pulse from the port ch18 are close to each other. In addition, it is determined that the off-timing (3800 µs) of the pulse from the port ch14 and the off-timing (3800 µs) of the pulse from the port ch15 are close to each other.

If it is determined that the off-timing is close (Y in step S2), the CPU 3 functions as a correction section, and corrects the schedule by adding a predetermined value (50 µs>predetermined time in the present embodiment) to the off-timing of one of the two pulses at which the off-timing is close to each other (step S3). In the present embodiment, since the CPU 3 determines that the off-timing of the pulses from the ports ch12, ch16 is close as described above, as shown in FIG. 5D, the CPU 3 adds 50 µs to the off-timing of the pulses from the port ch12 and corrects the off-timing to 3950 µs.

Since the CPU 3 determines that the off-timing of the pulses from the ports ch6, ch18 are close, the CPU 3 adds 50 µs to the off-timing of the pulse from the port ch6 and corrects the off-timing to 3650 µs. Further, since the CPU 3 determines that the off-timing of the pulses from the ports ch14, ch15 are close, the CPU 3 adds 50 µs to the off-timing of the pulse from the port ch15 and corrects the off-timing to 3850 µs.

When the correction is completed (step S3), the CPU 3 returns to step S2 and again determines whether or not the off-timing is close. If it is determined in step S2 that the off-timing is not close (N in step S2), the CPU 3 immediately ends the main processing.

On the other hand, the CPU 3 stops the above-described main processing every time the soft timer finishes the counting, and executes the interrupt processing shown in FIG. 4. In the interrupt processing, the CPU 3 functions as a pulse output section, and turns on or off the pulses of the ports ch1 to ch18 set in step S5 to be described later (step S4).

Thereafter, the CPU 3 functions as a setting section, and sets a pulse to be turned on or off next to the pulse that is turned on or off in step S4 in accordance with the schedule created in the previous cycle of the schedule that is currently created in the main processing (step S5). In addition, the CPU 3 sets the time until the set next pulse is turned on or off in the soft timer (step S5), and ends the processing. After the interrupt processing is completed, the CPU 3 continues the main processing. By the above operation, the CPU 3 operates in accordance with the corrected schedule shown in FIG. 5D.

According to the embodiment described above, the plurality of pulses can be output so that the on-timing or the off-timing of the two or more pulses is respectively not close to each other using the one soft timer. As a result, noise can be taken into account at low cost.

According to the embodiment described above, after creating the schedule in which the on-timing of the pulses is shifted at the constant interval, since the CPU 3 corrects the schedule such that the off-timing shifts, the CPU 3 can easily create the schedule such that the on-timing or the off-timing of the two or more pulses is respectively not close to each other.

According to the embodiment described above, the CPU 3 adds the predetermined value to the off-timing of one of the two pulses at which the off-timing is close. Accordingly, the off-timing can be corrected to be shifted simply by adding the predetermined value to the off-timing.

Further, according to the embodiment described above, the CPU 3 determines that the off-timing is close when the difference in the off-timing of the plurality of pulses is less than the predetermined time. Accordingly, it can be easily determine that the off-timing of the pulses is close.

According to the embodiment described above, the CPU 3 can prevent the off-timing from coming close by arranging the on-timing at the constant interval in the order of values of the duties.

According to the embodiment described above, every time the soft timer finishes counting the set time, the interrupt processing is executed by interrupting the main processing performed by the CPU 3. Accordingly, the program can be easily executed by one CPU 3.

According to the embodiment described above, the soft timer is used as a timer, but a hard timer may be used.

According to the embodiment described above, the CPU 3 arranges the pulses in the order of the values of the duties, but the present invention is not limited thereto. The arrangement order may be any order, and may be an order of arrangement of the ports ch1 to ch18 as shown in FIG. 5A.

According to the embodiment described above, the on-timing of the pulses is shifted at the constant interval, and the off-timing is corrected, but the present invention is not limited thereto. Conversely, the off-timing of the pulses may be shifted at the constant interval, and the on-timing is corrected.

According to the embodiment described above, the CPU 3 is used for controlling the LEDs 2 (light source), but the present invention is not limited thereto. The CPU 3 may be used for PWM control of a load, and the load may be a heater or the like.

Herein, characteristics of the control device, the illumination device, and the program for the control device according to the above embodiment of the present invention are summarized briefly in the following [1] to [8] respectively.

[1] A control device (3) that outputs a plurality of pulses each having a duty set independently, the control device including:

a schedule creation section (3) configured to create a schedule in which on-timing and off-timing of the plurality of pulses are designated such that the on-timing or the off-timing of two or more of the plurality of pulses is respectively not close to each other, based on the set duty and a cycle of the pulse;

a setting section (3) configured to set, in a timer for counting time, time from a time point where the timer finishes counting the time already set to on-timing or off-timing of a pulse to be first turned on or off after the time point in accordance with the schedule; and a pulse output section (3) configured to turn on or off the pulse in accordance with the schedule when the timer finishes counting the set time.

[2] The control device (3) according to [1], wherein the schedule creation section (3) includes a first creation section (3) configured to create the schedule in which one of the on-timing and the off-timing of the plurality of pulses is shifted at a constant interval, a second creation section (3) configured to create the schedule by obtaining another of the on-timing and the off-timing of the plurality of pulses based on the set duty from the one of the on-timing and the off-timing created by the first creation section, and a correction section (3) configured to correct the schedule so as to shift the other of the on-timing and the off-timing of the pulses at which the other of the on-timing and the off-timing is close, when the other of the on-timing and the off-timing of two of the plurality of pulses is close.

[3] The control device (3) according to [2], wherein the correction section (3) corrects the schedule by adding a predetermined value to the other of the on-timing and the off-timing of one of the two pulses at which the other of the on-timing and the off-timing is close.

[4] The control device (3) according to [2] or [3], wherein the correction section (3) determines that the other of the on-timing and the off-timing is close when a difference of the other of the on-timing and the off-timing of the plurality of pulses is less than predetermined time.

[5] The control device (3) according to any one of [2] to [4], wherein the first creation section (3) arranges the plurality of pulses in an order of a value of the set duty, and shifts the one of the on-timing and the off-timing at a constant interval in the arrangement order.

[6] An illumination device (1) including:
the control device (3) according to any one of [1] to [5]; and
a plurality of light sources (2) controlled by a plurality of pulses output from the control device (3).

[7] A control method for a control device (3) that outputs a plurality of pulses each having a duty set independently, the control method comprising:
a schedule creation step (3) configured to create a schedule in which on-timing and off-timing of the plurality of pulses are designated such that the on-timing or the off-timing of two or more of the plurality of pulses is respectively not close to each other, based on the set duty and a cycle of the pulse;
a setting step (3) configured to set, in a timer for counting time, time from a time point where the timer finishes counting the time already set to on-timing or off-timing of a pulse to be first turned on or off after the time point in accordance with the schedule; and
a pulse output step (3) configured to turn on or off the pulse in accordance with the schedule when the timer finishes counting the set time.

[8] The control method for the control device (3) according to [7],
wherein the setting step (3) and the pulse output step (3) are performed as an interrupt processing by interrupting the schedule creation section (3), every time the timer finishes counting the set time.

[9] A computer readable storage medium on which a program for a control device so as to executing the control method according to [7] or [8] by a computer is stored.

What is claimed is:

1. A control device that outputs a plurality of pulses each having a duty set independently, the control device comprising:
a schedule creation section configured to create a schedule in which on-timing and off-timing of the plurality of pulses are designated such that the on-timing or the off-timing of two or more of the plurality of pulses is respectively not close to each other, based on the set duty and a cycle of the pulse;
a setting section configured to set, in a timer for counting time, time from a time point where the timer finishes counting the time already set to on-timing or off-timing of a pulse to be first turned on or off after the time point in accordance with the schedule; and
a pulse output section configured to turn on or off the pulse in accordance with the schedule when the timer finishes counting the set time,
wherein the schedule creation section comprises:
a correction section configured to correct the schedule so as to shift the on-timing and the off-timing of the pulses when the on-timing and the off-timing of two of the plurality of pulses is close.

2. The control device according to claim 1,
wherein the schedule creation section further comprises:
a first creation section configured to create the schedule in which one of the on-timing and the off-timing of the plurality of pulses is shifted at a constant interval, and
a second creation section configured to create the schedule by obtaining another of the on-timing and the off-timing of the plurality of pulses based on the set duty from the one of the on-timing and the off-timing created by the first creation section.

3. The control device according to claim 2,
wherein the correction section corrects the schedule by adding a predetermined value to the other of the on-timing and the off-timing of one of the two pulses at which the other of the on-timing and the off-timing is close.

4. The control device according to claim 2,
wherein the correction section determines that the other of the on-timing and the off-timing is close when a difference of the other of the on-timing and the off-timing of the plurality of pulses is less than predetermined time.

5. The control device according to claim 2,
wherein the first creation section arranges the plurality of pulses in an order of a value of the set duty, and shifts the one of the on-timing and the off-timing at a constant interval in the arrangement order.

6. An illumination device comprising:
the control device according to claim 1; and
a plurality of light sources controlled by a plurality of pulses output from the control device.

7. A control method for a control device that outputs a plurality of pulses each having a duty set independently, the control method comprising:
a schedule creation step configured to create a schedule in which on-timing and off-timing of the plurality of pulses are designated such that the on-timing or the off-timing of two or more of the plurality of pulses is respectively not close to each other, based on the set duty and a cycle of the pulse;
a setting step configured to set, in a timer for counting time, time from a time point where the timer finishes counting the time already set to on-timing or off-timing of a pulse to be first turned on or off after the time point in accordance with the schedule; and
a pulse output step configured to turn on or off the pulse in accordance with the schedule when the timer finishes counting the set time,
wherein the schedule creation section comprises:
correcting the schedule so as to shift the on-timing and the off-timing of the pulses when the on-timing and the off-timing of two of the plurality of pulses is close.

8. The control method according to claim 7,
wherein the setting step and the pulse output step are performed as an interrupt processing by interrupting the schedule creation step, every time the timer finishes counting the set time.

9. A computer readable storage medium on which a program for a control device so as to executing the control method according to claim 7 by a computer is stored.

* * * * *